April 24, 1934. H. AHLQVIST 1,955,722
METHOD OF SEPARATING SULPHUR FROM SULPHUR DIOXIDE
Filed Oct. 7, 1931
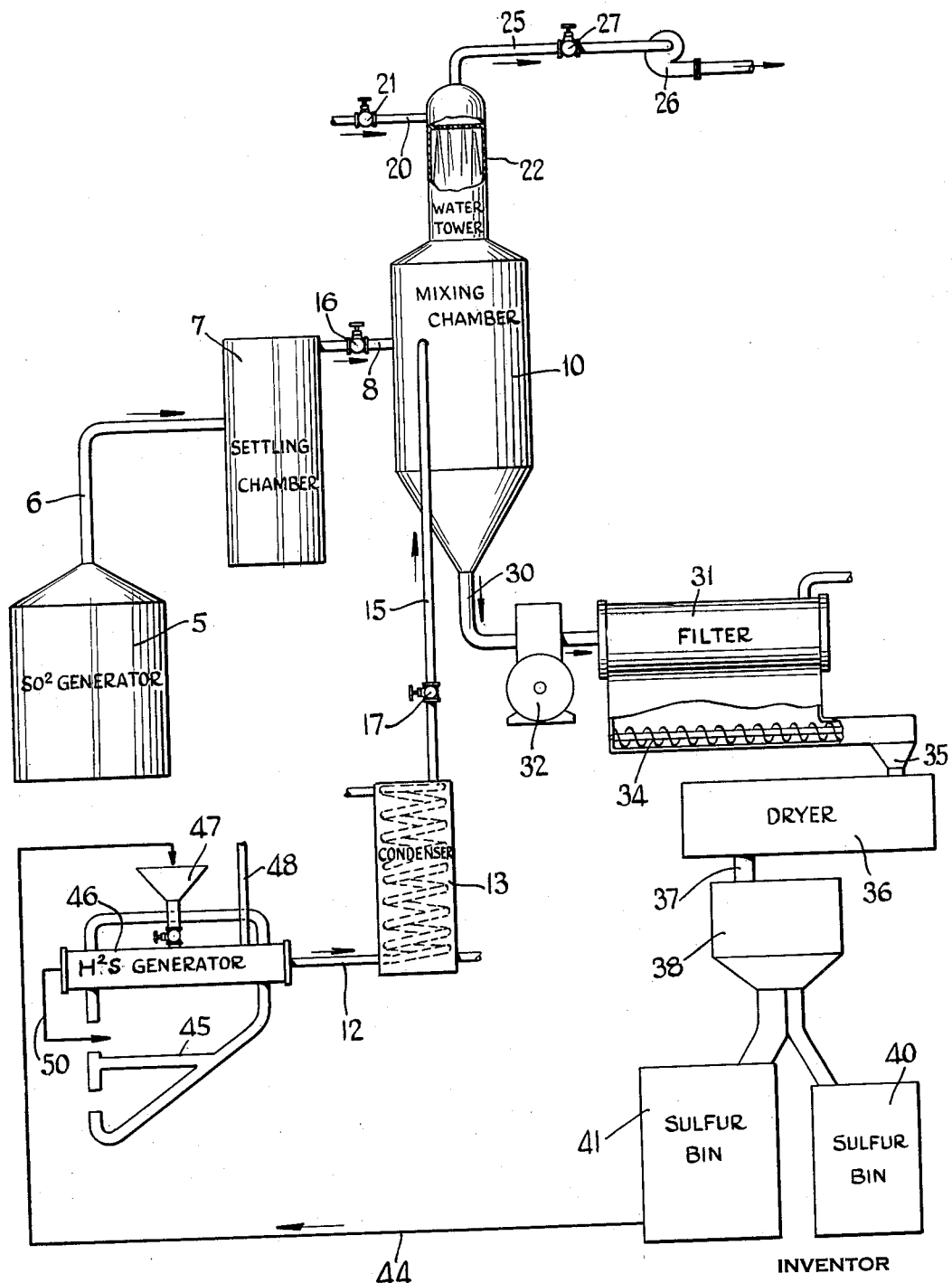
INVENTOR
HARALD AHLQVIST
BY
Hammond & Littell
ATTORNEYS Patented Apr. 24, 1934                                                    1,955,722

UNITED STATES PATENT OFFICE 1,955,722

METHOD OF SEPARATING SULPHUR FROM SULPHUR DIOXIDE

Harald Ahlqvist, Rye, N. Y.

Application October 7, 1931, Serial No. 567,375

8 Claims. (Cl. 23—226)

The present invention relates to the recovery of sulphur from sulphur dioxide gases and has for an object to provide an improved method and an improved apparatus for treatment of such gases to render the same innoxious and to recover the sulphur therefrom.

Sulphur dioxide produced as a waste flue gas in various plants in the treatment of ores containing sulphur when allowed to escape into the air is extremely destructive to animal and vegetable life and is extremely disagreeable to human beings. It is not uncommon for vegetation to be killed over a considerable area by the fumes from a single plant. Furthermore such plants are frequently located in sections where there is a substantial demand for sulphur which if it must be shipped from distant sulphur mines is relatively expensive.

The present invention provides a process and apparatus for use in carrying out the process, whereby sulphur can be precipitated from the sulphur dioxide at a moderate expense and relatively pure sulphur thereby obtained. The process of the invention is so designed as to operate on a continuous cycle using as necessary raw material in addition to the sulphur dioxide gas only a hydrocarbon oil, such as common fuel oil. The oil is used both to supply hydrogen for the generation of hydrogen sulphid and as fuel. In the hydrogen sulphid generator the hydrocarbon oil is treated at high temperature with sulphur precipitated in the process and the hydrogen sulphid so formed as combined with the sulphur dioxide to precipitate sulphur. Two-thirds of the sulphur produced is precipitated from the hydrogen sulphid and one-third from the sulphur dioxide. It follows, therefore, that in order to maintain the process continuously two-thirds of the sulphur must be fed to the hydrogen sulphid generator for the continuous production of the required amount of hydrogen sulphid. The other third of the sulphur produced represents the amount precipitated from the sulphur dioxide and all of this is saved for use or sale.

The nature and objects of the invention will be better understood from the description of a particular illustrative process and the apparatus used in carying out the process for the purpose of which description reference should be had to the accompanying drawing forming a part hereof and in which—

The figure is a diagrammatic illustration showing the arrangement of apparatus which may be used in carrying out the process of the invention.

The sulphur dioxide used in the process is ordinarily a by-product and may be derived from any suitable source such as the roasting of sulphur bearing metal ores. In the diagram it is represented as being delivered by a generator 5 which may be an ordinary ore roasting furnace through a conduit 6, a dust settling chamber 7 and conduit 8 to the mixing chamber 10. The settling chamber is preferably, but not necessarily, used in order to remove dust and therefore to reduce the impurities in the sulphur ultimately precipitated.

In the mixing chamber the sulphur dioxide is combined with hydrogen sulphid from a hydrogen sulfid generator 11. It is usually found desirable to cool the hydrogen sulphid sufficiently to condense and separate out any more volatile oil which may be carried forward from the hydrogen sulphid generator. As shown the hydrogen sulphid passes through a conduit 12 to a condenser 13 and from thence by a conduit 15 to the mixing chamber.

The hydrogen sulphid and the sulphur dioxide are combined in the mixing chamber in proportions to react in accordance with the formula—

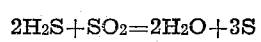
$$2H_2S + SO_2 = 2H_2O + 3S$$

and to this end valves 16 and 17 are provided in the conduits 8 and 15, respectively, for suitably controlling the flow of these gases. The reaction within the mixing chamber is exothermic and ordinarily the water is produced in the form of steam whether or not the sulphur is volatilized.

In any event it is desirable to provide means for cooling the mixture. A convenient means consists in supplying water, as for example through a conduit 20 controlled by a valve 21, to a suitable spray tower 22 forming a part of or suitably connected with the mixing chamber.

Such gas and vapor as may remain after the reaction and the cooling may advantageously be drawn off from the mixing chamber as for example by means of a conduit 25 leading from the top of the spray tower. A centrifugal pump 26 is conventionally illustrated as connected to the conduit 25 for this purpose, a valve 27 being preferably provided to facilitate desired control.

From the mixing chamber the water carrying the sulphur flowing therein is passed through a conduit 30 to a suitable filter 31 for separating the precipitated sulphur from the water. A pump 32 is shown for forcing the sulphur carrying water into and through the filter. In the drawing a screw conveyor 34 is indicated conventionally as receiving the sulphur from the filter press 31 to carry it forward through a conduit 35 to a steam drier 36 whence the dry sulphur is discharged from a conduit 37 to a suitable sulphur bin 38. This sulphur bin is conventionally illustrated as provided with a divided outlet so arranged as to divert one-third of the sulphur into a storage bin 40 and two-thirds into a bin 41. The sulphur discharged in the bin 40 represents the product of the operation whereas the sulphur in the bin 41 represents the amount which must be returned in the cycle of operation for the production of the hydrogen sulphid used in the process. This sulphur is carried by any suitable conveyor as represented diagrammatically by the line 44 to the hydrogen sulphid generator 11.

The hydrogen sulphid generator may be of any suitable or desired form. As shown, it comprises a grate 45 above which is provided a retort 46. The sulphur is fed to the retort through a suitable hopper 47 and simultaneously oil, such for example as common fuel oil, is fed as through a pipe 48 to the retort in which the oil is treated with the sulphur at a sufficient temperature to form hydrogen sulphid. The residue of the oil is passed from the retort to the grate as indicated by the line 50 and there burned to provide heat for the reaction.

It may be desirable in some cases to provide heat exchange means between the different parts of the apparatus to conserve the heat produced in the process but this is not ordinarily necessary and is not indicated.

In installations where the sulphur dioxide is a by-product of another process the only material to be added to carry out the process is the fuel oil or crude oil which is relatively cheap. Two thirds of the sulphur produced is used to carry on the reaction by recycling through the process and one third of the sulphur is available for general sale or use at a cost of production which is represented only by the cost of the oil and the depreciation and wear on the apparatus and in as much as this process also solves the problem of disposal of the waste sulphur dioxide gases, it may provide additional economies in this respect.

The foregoing particular description is illustrative merely and is not intended as defining the limits of the invention.

I claim—

1. The method of rendering innoxious sulphur dioxide and recovering therefrom sulphur in a continuous operation which comprises treating the sulphur dioxide with hydrogen sulphid to precipitate sulphur, producing hydrogen sulphid from two-thirds of the sulphur, and returning the hydrogen sulphid so produced and treating the sulphur dioxide therewith.

2. The method of rendering innoxious sulphur dioxide and recovering therefrom sulphur in a continuous operation which comprises treating the sulphur dioxide with hydrogen sulphid to produce water vapor and sulphur, withdrawing two-thirds of the sulphur and treating said sulphur at a high temperature with a hydrocarbon oil to produce hydrogen sulphid and treating the sulphur dioxide with such hydrogen sulphid.

3. The method of rendering innoxious sulphur dioxide and recovering therefrom sulphur in a continuous operation which comprises combining hydrogen sulphid with the sulphur dioxide to produce water vapor and sulphur, separating the sulphur, treating two-thirds of the sulphur with hydrocarbon oil at a high temperature to produce hydrogen sulphid, burning the residue of the hydrocarbon oil to provide heat for the production of the hydrogen sulphid, and combining such hydrogen sulphid with the sulphur dioxide substantially as described.

4. The method of rendering innoxious sulphur dioxide recovering therefrom the sulphur, as defined in claim 3, which comprises also cooling the hydrogen sulphid before combining the same with the sulphur dioxide.

5. The method of rendering innoxious sulphur dioxide recovering therefrom sulphur in a continuous operation which comprises combining hydrogen sulphid with the sulphur dioxide in a mixing chamber to produce water vapor and sulphur, cooling the water vapor and sulphur by means of a water spray, exhausting volatile constituents from the mixing chamber, separating the sulphur, drying such sulphur, treating two-thirds of the resultant sulphur with a hydrocarbon oil at high temperature to produce hydrogen sulphid, and combining the hydrogen sulphid with the sulphur dioxide.

6. The method of producing free sulphur from sulphur dioxide gases, which comprises reacting sulphur dioxide with hydrogen sulphid to produce free sulphur and water, separating the sulphur from the water and using two-thirds of the free sulphur to generate more hydrogen sulphid, and reacting sulphur dioxide with such hydrogen sulphid to continuously sustain the cycle of reactions.

7. The method of rendering innocuous sulphur dioxide and recovering therefrom sulphur in a continuous operation which comprises maintaining a cycle of operation consisting of reacting hydrogen sulphid with sulphur dioxide in a mixing chamber to produce water vapor and sulphur, cooling the water vapor and sulphur by means of a water spray, exhausting volatile constituents from the mixing chamber, separating the sulphur, drying said sulphur, dividing the dried sulphur into two parts in the proportion of ⅓ and ⅔, reacting the ⅔ portion with a hydrocarbon oil at high temperature to produce hydrogen sulphid and reacting the hydrogen sulphid so produced with sulphur dioxide in the mixing chamber.

8. The method of rendering innocuous sulphur dioxide which comprises producing a cycle of operations comprising reacting sulphur dioxide with hydrogen sulphid to produce sulphur and producing hydrogen sulphid from the sulphur, introducing sulphur dioxide into the cycle at one point and withdrawing sulphur from the cycle at another point, substantially as described.

HARALD AHLQVIST.